United States Patent
Kani

Patent Number: 5,762,859
Date of Patent: Jun. 9, 1998

[54] BLOW MOLDING METHOD FOR PRODUCING SYNTHETIC RESIN RECEPTACLE WITH INTEGRAL GAP

[76] Inventor: Koji Kani, 41 Yamazaki, Naka, Kagamihara-shi, Gifu-ken, 504, Japan

[21] Appl. No.: 618,463

[22] Filed: Mar. 15, 1996

Related U.S. Application Data

[62] Division of Ser. No. 372,184, Jan. 13, 1995, Pat. No. 5,553,732.

[51] Int. Cl.[6] ................................................. B29C 49/70
[52] U.S. Cl. ...................... 264/523; 264/536; 264/540; 264/152; 264/334
[58] Field of Search .......................... 264/152, 523, 264/524, 527, 536, 540, 334

[56] References Cited

U.S. PATENT DOCUMENTS

| | | | |
|---|---|---|---|
| 3,632,717 | 1/1972 | Showalter et al. | 264/152 |
| 5,213,753 | 5/1993 | Przytulla | 264/152 |

FOREIGN PATENT DOCUMENTS

| | | | |
|---|---|---|---|
| 2391056 | 1/1979 | France | 264/524 |
| 1815906 | 7/1970 | Germany | 264/524 |
| 2714917 | 10/1978 | Germany | 264/524 |

*Primary Examiner*—Catherine Timm
*Attorney, Agent, or Firm*—Ron Fish; Falk & Fish LLP

[57] ABSTRACT

The object of this invention is to provide a receptacle with a closure cap which is molded simultaneously with the receptacle body by using blow mold machine. A synthetic resin material is introduced into a pair of mold halves and a fluid such as air is injected into the tube to expand the tube against the walls of the mold thereby shaping the receptacle body. The synthetic resin receptacle of this invention comprises a tubular receptacle body 1, a small tube 2 at one end of the tubular receptacle body for filling, a closure cap fitting portion 3 formed at the top end of the vessel body, a diametrically small cut-out portion 5 joining the top end of said closure cap fitting portion and having a small bore, a cap body 4 having reversed-C like shape in a hollow configuration and joining the cut-out portion 5. A projection 7 provided in the center portion of the vertical inner surface of said closure cap body plugs the small bore. Ribs on the inner surface of the cap body and the perimeter of a reduced diameter portion on the top of the receptacle engage each other to form a seal. To use the receptacle, a user detaches the closure cap body from the receptacle body thereby unblocking the small bore allowing contents to be dispensed. To re-seal the receptacle, the closure cap is crowned on the receptacle body forcing the projection 7 to seal the small bore.

1 Claim, 2 Drawing Sheets

BLOW MOLDING METHOD FOR PRODUCING SYNTHETIC RESIN RECEPTACLE WITH INTEGRAL GAP

This is a divisional of a prior U.S. application Ser. No. 08/372,184, filed Jan. 13, 1995, now U.S. Pat. No. 5,553,732.

BACKGROUND OF THE INVENTION

The invention relates to a synthetic resin receptacle for holding food such as mayonnaise and ketchup, or any other kind of liquid or powder, such as chemicals or glue, and in particular a receptacle produced by the so-called blow molding method which comprises guiding a tube of synthetic resin material between a pair of molds and forcing air into the tube for shaping the tube between the molds.

The process of blow-molding a hollow article made of sythetic resinous materials involves clamping a hollow tubular blank of synthetic resinous material in a split mold such that the tubular blank is hermetically sealed at its opposite ends. The mold is then closed and a hollow needle is inserted through an opening in the mold so as to puncture the resinous material. Compressed air is then injected so as to expand the resinous material against the inside surfaces of the split mold halves so as to form a hollow article in the form of the mold. This prior art process is described in U.S. Pat. No. 3,305,891 which is hereby incorporated by reference.

Blow molded receptacles made by this process and filled up With contents were typically sealed by electrically heating one end thereof to soften the resinous material and essentially weld the receptacle closed thereby preventing resealing the receptacle. If such a receptacle were filled with a juice or liquid food, such receptacles had to be emptied at once to avoid spoilage of the food since once the weld was broken, the receptacle could not be resealed easily by the consumer. If paste such as mayonnaise, ketchup or glue was held in the receptacles for dispensing, a closure cap made of the comparatively hard materials had to be provided independently.

To provide for caps which could reseal the receptacle, in the prior art, two different kinds of manufacturing machines and metallic molds had to be provided so as to manufacture such a receptacle and a cap for the receptacle since the receptacles and closure caps have to be produced by two different molding methods, specifically blow and injection molding, respectively.

Furthermore, it was very inconvenient to transport and handle the separate receptacles and caps produced independently to the location where the receptacles were to be filled.

SUMMARY OF THE INVENTION

The object of this invention is to provide a receptacle with an integral cap which can be used to reseal the receptacle, both the cap and receptacle being molded in one operation by using a blow mold device and method. The synthetic resin receptacle of this invention comprises a tubular body of, the receptacle which is molded between a pair of mold halves from a tube of synthetic material into which a fluid such as air is forced for shaping. The receptacle body includes a small diameter nozzle disposed at the distal end for infusing contents into the receptacle, a fitting plug portion disposed at the upper end thereof, a cut-away portion jointly disposed at the upper end of the plug portion and having a bore passage, and a closure cap portion joining to the cut-away portion allowing a blow fluid to pass through the bore passage into the receptacle body. The closure cap portion is shaped in a sectionally reversed-C like configuration and has an inner projection adapted to tightly fit in the bore passage of the cut away portion as the cap is crowned on the plug portion.

In use, the closure cap portion is cut away from the receptacle body and fitted on the fitting plug portion of the body with the projection tight on the bore passage of the receptacle. The method of producing the synthetic resin receptacle of this invention uses a mold device including a cavity section for shaping a tubular receptacle body, a cavity section for shaping a closure cap fitting plug portion Joining the top of the receptacle body; a section joining the upper end of the section for shaping a small diametrical cut-off portion, and a section in turn joining the section for shaping a sectionally reversed-C shaped closure cap, a mold section located centrally in the inner surface of the section for shaping a projection with a substantially equivalent diameter to the cut-off portion-shaping mold section. One half of the mold has a slide bore horizontally extending therethrough and opening at the inner end adjacent another mold half section, and a slide member 16 fitted through the bore 15.

In operation, a tube of synthetic resin material is introduced between a pair of the molds 10 and 11, and air or other fluid is forced into the tube retained between the molds, whereby the mold device simultaneously shapes a receptacle body and closure cap body. To facilitate opening the mold pair from each other for separating the molded article therefrom, the slide member 15 is moved through the bore in the direction of the cap body to exert a force thereon.

Thus, the receptacle product is cheaply and effectively produced only by means of the blow molding machine. This has the advantage of dispensing with the injection molding method because the receptacle body and the cap body in the receptacle are simultaneously and easily molded by the blow mold method.

In use, the receptacle of this invention is filled up suitably with a drink such as juice or a paste such as mayonnaise, ketchup or glue. When the user wishes to stop dispensing contents from the receptacle, the fitting part which is provided in the top end of the said receptacle body can be capped with the cap body which is cut and taken apart from the said vessel body. Accordingly, If an user stops drinking or dispensing the contents from the receptacle body, the contents can be kept tightly in the said receptacle and prevented from drying out. When a user stops drinking or dispensing the contents from the receptacle, the receptacle body is stable and is not easily tipped over, and is upstanding with the top face of the cap lying on a surface. The contents remaining after dispensing a portion thereof may sometimes be dried and solidified. When the receptacle is left standing inverted as above-stated With the cap body lower, the contents remain adjacent the dispensing opening which prevents them from drying and solidifying. Leaking of the contents is eliminated because the projection provided in the cap body is tightly fitted into the small bore of the receptacle body thereby preventing leakage.

The object of this invention to provide a cap unit with a receptacle for holding juice by the known blow mold method in one unit, thus enabling the receptacle of the invention to be sold at a fairly reasonable price in comparison with those manufactured for the production by the conventional method.

DETAILED DESCRIPTION OF THE PREFERRED EMBODIMENT

Figure 1:
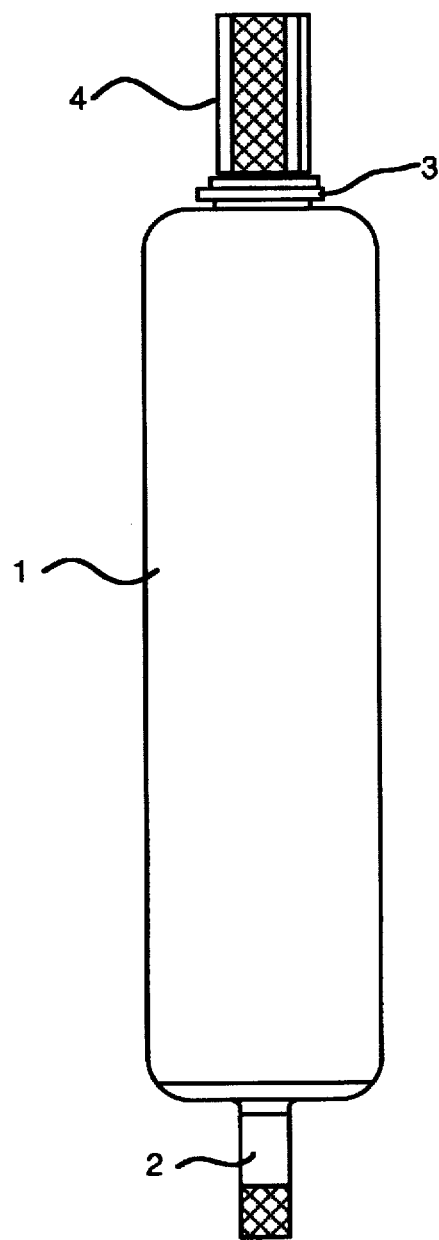
FIG. 1 shows a front view of a synthetic resin receptacle produced by the method according to the invention.

Referring to FIG. 1, there is shown an embodiment of a food receptacle which is blow molded. The receptacle is blow molded from a synthetic resin using a tube guided into the mold device and through which air is forced into the mold. Reference numeral 1 designates a receptacle body having a small tube 2 through which juice, paste or other contents may be placed in the receptacle. The top end of the receptacle has a projection 3 which is smaller in diameter than the receptacle 1 and is molded as part of the receptacle 1.

Figure 2:
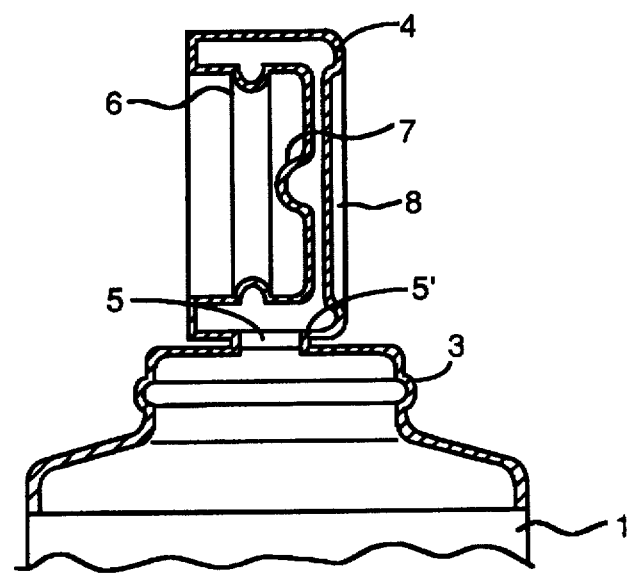
FIG. 2 shows a sectional, longitudinal view of a portion of the receptacle produced by the method of this invention.

Referring to FIG. 2, there is shown a sectional view of the top portion of the molded receptacle. A closure cap body 4 is molded as part of the top end of the receptacle body 1 at the same time the receptacle 1 is molded and has a cross section shaped like a hollow reversed-C. A small bore 5 is provided at an intersection wall between the projection 3 for fluid communication between the inside of the receptacle 1 and the chamber defined by the closure cap body 4. This allows air or other material which is injected into the inner part of the receptacle body 1 to move into the cap body 4 through the small bore 5. The cap body 4 has an inner surface of the reversed-C like shape and of the same shape and approximate size as the reduced diameter portion of the receptacle body 1 on which rib or projection 3 is formed. The inner surface of the cap body is provided with a circumferential rib or projecting portion Which engages with the rib or projection 3 on the outer surface of the reduced diameter portion of the receptacle body. The projections 3 and 6 may also be shaped in any other form other than that shown here in alternative embodiments. For example, rib 3 may received in a groove of the same shape and size formed in the inner surface of the cap body portion 4. Alternatively, the ribs 3 and 6 may be replaced by meshing threads.

A projection 7 is provided centrally in the vertical inner surface of the cap body 4. This projection 7 has a diameter and shape such that it can fit into and seal small bore 5 of the said receptacle body 1 when the cap body 4 is crowned on the receptacle body 1. Furthermore, the outer surface of the cap body 4, i.e., the upper surface of the cap body 4 when it is crowned on the receptacle body 1, may be recessed in some embodiments as shown at 8 so as to form a crater with a rim. When the cap body 4 is still in place as molded onto the reduced diameter portion of the receptacle body 1, it acts as a seal preventing escape of the contents of the receptacle body.

To use the receptacle, suppose that the receptacle body 1 is filled with a liquid food such as juice or mayonnaise. The user of the contents detaches the cap body 4 from the receptacle body 1 to access the liquid food inside. Then he drinks or dispenses the contents through the small bore 5. When the user stops drinking or dispensing the contents, the cap body 4 is crowned on the reduced diameter upper part of the receptacle body by engaging the rib 3 thereon with the rib 6. Normally, this is done by pushing the cap body 4 down over the reduced diameter portion such that the rib 6 is compressed by rib 3 until cap body 4 has been pushed down far enough to allow rib 6 to expand and engage the side walls of the reduced diameter portion of the reduced diameter portion just below the rib 3. In this case the projection 3 of the receptacle body 1 and the projection 6 of the cap body 4 are tightly engaged to each other forming a seal and preventing the contents of the receptacle body from leaking. Furthermore, the projection 7 provided in the cap body 4 fits into the small bore 5 of the receptacle body 1 thereby sealing the contents receptacle therein when the cap is crowned on the receptacle.

When the receptacle of this invention is not used, the receptacle body is left standing inverted with the cap body 4 downward or lower than the main portion of the receptacle 1. One of the advantages of this embodiment is enhanced stability when the receptacle is not in use.

Figure 3:
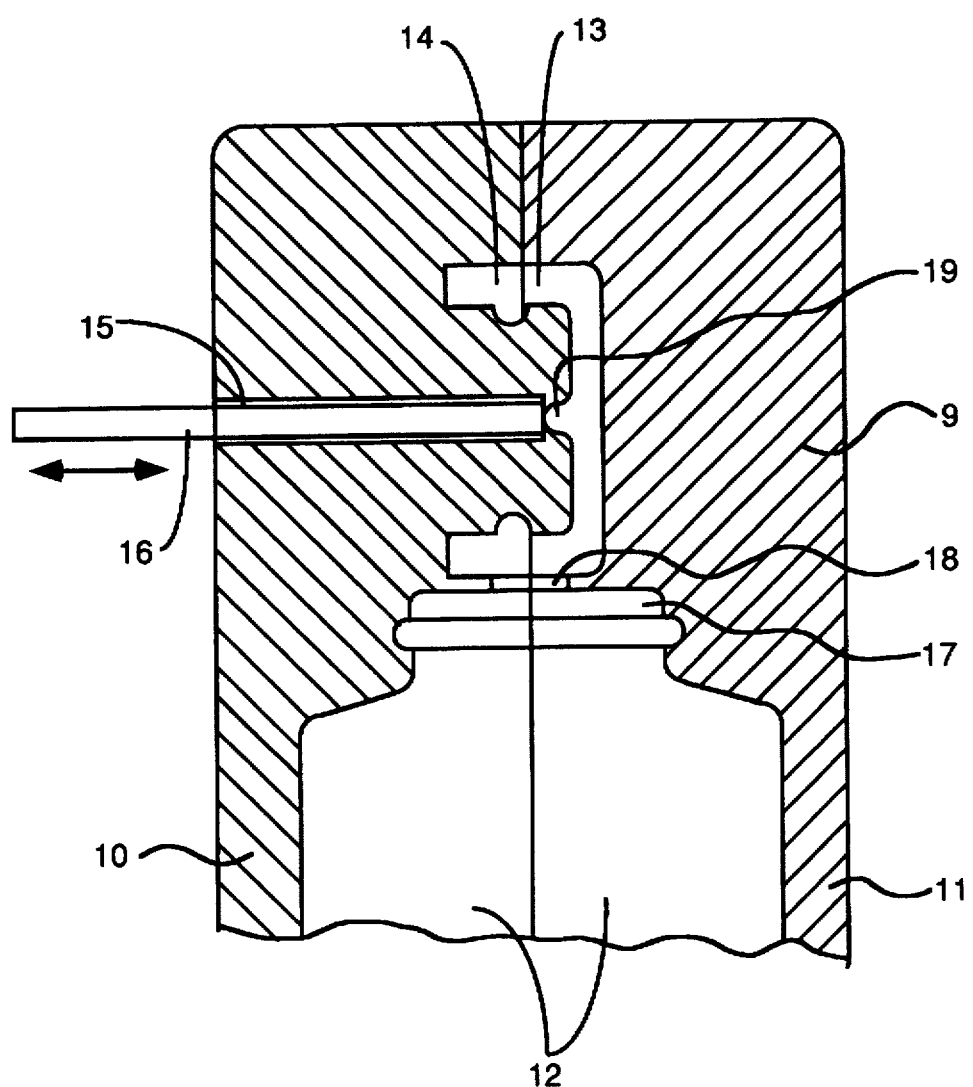
FIG. 3 shows a partial sectional view of a mold device used in the manufacturing method of this invention.

A mold device 9 for producing the receptacle is shown in FIG. 3. The mold is a split-cavity type having a pair of mating mold halves 10 and 11. When the molding operation is completed, at least one of the mold halves 10 or 11 is moved linearly or pivotally away from the other so that the finished molded receptacle can be easily removed from from the mold device 9.

As shown ink FIG. 3 the mold device 9 has a cavity section 12 for shaping a tubular receptacle body, a cavity section 17 for shaping the reduced diameter portion on which rib 3 is formed and joining to the top end of receptacle body 1. The mold also has an open connecting bridge section 18 joining the upper end of the cavity in which the cap will be formed to the lower section 17 of the mold which shapes the receptacle. The connection bridge 18 serves to shape the small bore 5 in FIG. 2 forming the fluid passageway through which the injected air or fluid can pass between the cap, reduced diameter and receptacle mold sections thereby expanding the synthetic resin material in both the cap, reduced diameter and receptacle forming cavity sections of the mold and also forming a small diameter cut-off part where the cap body 4 may be easily detached from the reduced diameter portion. The mold also has a part 13 which joins the section 18. The part 13 of the mold serves to form the reverse-C shaped cap body portion 4. The mold device further includes a cavity section 19 for shaping projection 7 with a substantially equivalent diameter to that of section 18 so that the projection 7 can seal the small bore 5. The section 19 of the mold is located centrally in the inner surface of the closure cap body 4 shaping section 13. A slide bore 15 through which a solid slider member 16 is moved is formed horizontally in mold half 10. The slide bore 15 opens near the cavity section 19 for shaping the projection. FIG. 3 also shows a cavity section 14 for shaping the circular rib or projection 6 in the closure cap on the inner surface thereof. Blow molding is accomplished by inserting a hollow needle (not shown) in through the mold so as to puncture the resinous material and then injecting compressed air so as to simultaneously form the cap the the receptacle by blow molding as further described below.

There follows a description of how the mold is used to form the device show in FIGS. 1 and 2. When the mold halves 10 and 11 open, a synthetic resin material tube is introduced between the mold halves 10 and 11 in the direction of the upper center portion thereof. The mold halves 10 and 11 are then closed so as to hermetically seal the sythetic resin material inside the mold halves. The synthetica resin material tube is held in place by the inner surfaces of the closed mold halves and 18 inflated by pressurized air using a needle inserted into a suitable position of the tube through which fluid or air is injected. The injected fluid expands the synthetic resin material tube against the inside walls of the mold. Consequently, the receptacle body 1 and the cap body 4 are molded simultaneously in the mold device. Subsequently, the mold halves 10 and 11 are moved apart and the receptacle body 1 which is cast in the two mold hollows is removed.

The receptacle body 1 can be pressed in the direction of the closure cap body 4 by the slider member 16 of the sliding bore 15 provided in the mold hollow 10 whereby the closure cap body 4 is moved so that the molded article can be easily removed from the mold. Means for controlling and activating the slider member 16 is omitted from the description. When this kind of receptacle is molded by a rotary mold machine, a cam plate may be provided in the machine for actuating the slider member. Alternatively, an actuator therefore may be formed by known timer, magnetic actuator and relay switch means.

What is claimed is:

1. A method for producing a synthetic resin receptacle using a mold device comprising a pair of mold halves and including a cavity section for shaping a cylindrical receptacle body having a first diameter and a long axis running parallel to the cylindrical walls of said receptacle body, a reduced diameter section forming cavity section for shaping a reduced diameter portion jointly formed at the end of said receptacle body where the contents are dispensed when said receptacle has contents, a cut-off section forming cavity section joining to an end of said cut-off section forming cavity section farthest away from any portion of said receptacle body having said first diameter, said cut-off section forming cavity section for shaping a small diameter cut-off portion which is smaller in diameter than the diameter of said reduced diameter portion, a closure cap cavity section for shaping a closure cap body having a longitudinal reversed-C shaped section, a projection forming cavity section located centrally of the surface of the closure cap cavity section which is orthogonal to the long axis of said receptacle body when said closure cap portion is in place on and sealing said receptacle body, said projection portion cavity for shaping a projection on said closure cap having a substantially equivalent diameter to that of said small diameter cut-off portion shaping cavity section, a slide bore through which a slider member may be moved, said slide bore extending into one of said mold halves at an angle which is approximately 90 degrees to said long axis of said receptacle body and having an opening at one end adjacent the projection forming cavity section, a slider member moving through said slide bore, said method comprising the steps of:

introducing a tube made of synthetic resin between said pair of the mold halves, closing the mold halves so as to hermetically seal said synthetic resin material inside said mold halves;

forcing a blow fluid into the tube while held in place in the closed mold halves so as to blow mold the closure cap body and the receptacle body in the mold device, moving the slider member in the slide bore in one of the mold halves in the direction of the closure cap body when both of the mold halves have been moved apart and thereby facilitating removing said receptacle and cap body from the mold device.

* * * * *